United States Patent [19]

Chino et al.

[11] Patent Number: 4,776,997
[45] Date of Patent: Oct. 11, 1988

[54] THICKNESS-CORRECTING COATING METHOD

[75] Inventors: Naoyoshi Chino; Tsunehiko Sato; Keiji Tanaka; Kenichi Fukumura; Yasuhito Hiraki, all of Kanagawa, Japan

[73] Assignee: Fuji Photo Film Co., Ltd., Kanagawa, Japan

[21] Appl. No.: 3,876

[22] Filed: Jan. 16, 1987

[30] Foreign Application Priority Data

Jan. 16, 1986 [JP] Japan .................................. 61-5138

[51] Int. Cl.$^4$ ............................................. B29C 47/92
[52] U.S. Cl. ................................. 264/40.2; 118/410; 118/679; 264/40.5; 264/40.7; 425/141; 425/224; 427/8; 427/9; 427/44; 427/48
[58] Field of Search ............... 264/40.7, 40.5, 40.2, 264/216; 425/141, 224; 427/44, 48, 9, 8; 118/679–680, 410

[56] References Cited

U.S. PATENT DOCUMENTS

| | | |
|---|---|---|
| 2,750,986 | 6/1956 | Russell et al. .................. 425/141 |
| 2,793,345 | 5/1957 | Hags ............................. 425/141 |
| 3,523,987 | 8/1970 | Camhi et al. ................... 425/141 |
| 4,142,010 | 2/1979 | Pipkin et al. .................. 427/355 |
| 4,145,173 | 3/1979 | Pelzer et al. .................. 425/141 |
| 4,424,762 | 1/1984 | Tanaka et al. .................. 118/410 |
| 4,440,106 | 4/1984 | Greiner et al. ................. 264/108 |
| 4,587,066 | 5/1986 | Rodriguez ...................... 264/108 |
| 4,681,062 | 7/1987 | Shibata et al. ................. 118/410 |

FOREIGN PATENT DOCUMENTS 55-34957 11/1980 Japan .................................. 425/141
58-104666 6/1983 Japan .

Primary Examiner—Jeffery Thurlow
Attorney, Agent, or Firm—Sughrue, Mion, Zinn, Macpeak, and Seas

[57] ABSTRACT

A coating method and apparatus using an extrusion head to apply a liquid film to a running web. The thickness of the film is measured at two transverse points and a roller conveying the web is tilted to correct any difference. The amount of tilt per roller with a roller bearing span of 750 mm is 0.5 to 20 mm, preferably 0.5 to 15 mm.

8 Claims, 2 Drawing Sheets

THICKNESS-CORRECTING COATING METHOD

BACKGROUND OF THE INVENTION

1. Field of the Invention

This invention relates to coating methods, and more particularly to a coating method which is employed for the manufacture of coated products which are elongated and relatively wide, such as magnetic recording materials.

2. Background of the Invention

In a conventional method of manufacturing magnetic recording materials or the like, coating solutions for forming a magnetic layer, a protective layer and a back layer are continuously and uniformly applied to a belt-shaped support which is elongated and relatively wide. Specifically, the web has a thickness of several micrometers to several hundreds of micrometers, a width of several hundreds of millimeters to several thousands of millimeters, and a length of several hundreds of meters to several thousands of meters. The web is made, for instance, of polyethylene terephthalate. After these coated layers are dried, the web with the layers is wound on a winding core. The web thus wound is longitudinally cut into a number of belt-shaped pieces. Each of the belt-shaped pieces thus formed is further cut to the length of the desired product and then wound on a spool or the like.

A variety of methods such as a roll coating method, gravure coating method, extrusion coating method and slide bead coating method have been employed for coating the web with the coating solution. In these coating methods, in order to form on the web a film which is uniform in thickness in the widthwise direction after drying, the coating operation is carefully carried out with the coating apparatus set with high accuracy.

Recently, in order to mass-produce magnetic recording materials, it has been required in the art to coat a web with a coating solution at high speed in such a manner that the thickness of the film formed on the web is uniform both in the direction of the width and in the direction of the length. In the case of coating a web with a coating solution at high speed, in the roll coating method or gravure coating method the speed of rotation of the roll is considerably high, so that the coating solution is splashed from the roll, thus smudging the web and the peripheral equipment. Also air may be taken into the solution pool, thus forming bubbles or stripes in the film formed on the web. In order to eliminate these difficulties, when it is required to coat a web with a coating solution at high speed, the extrusion type coating method has been employed. Various types of extrusion coating methods have been described (Japanese Patent Application Publication No. 7306/1979, and Japanese Patent Application (OPI) No. 104666/1983 and U.S. Pat. No. 4,681,052).

In the extrusion type coating method, the coating head is pushed against the web in such a manner that a clearance corresponding to the thickness of a film to be formed on the web is provided between the coating head and the web. That is, a solution pool is formed between the coating head and the web. Being formed between the coating head and the web, the solution pool is pressurized. The pressure of the solution pool acts on the web, while the web pushes back the solution pool, so that the coating operation is stably carried out.

In the above-described coating method, sometimes the film formed on the web is not uniform in thickness in the widthwise direction. This difficulty is especially significant when the web is under greater tension on one side than on the other side with respect to a longitudinal line down the center of the web.

In this case, the web pushes the coating head more at the one side than at the other side. As a result, the thickness of the formed film is smaller on the one side where the coating head is pushed more strongly than on the other side. The non-uniformity of the film thickness is sometimes as much as several percent (%) to several tens of percent of the desired thickness, thus providing a serious problem for manufacture of belt-shaped magnetic recording materials or the like.

SUMMARY OF THE INVENTION

Accordingly, an object of this invention is to provide a coating method in which the film coated on the web is always uniform in thickness in the widthwise direction irrespective of the conditions of the base.

The foregoing object and other objects of the invention have been achieved by the provision of an extrusion type coating method in which coating solution is applied to a running elongated and relatively wide web with a coating head abutted against the web. According to the invention, the thickness of a film formed on the web is detected, and according to the variation in the thickness of the film, at least one roll in the coating zone is tilted in a direction perpendicular to the surface of the web so as to cancel out the variation in the thickness, thereby to make uniform the film thickness in the widthwise direction of the web.

The nature, principle and utility of the invention will become more apparent from the following detailed description and the appended claims when read in conjunction with the accompanying drawings.

DETAILED DESCRIPTION OF THE EMBODIMENTS

This invention will be described with reference to the accompanying drawings.

Figure 1:
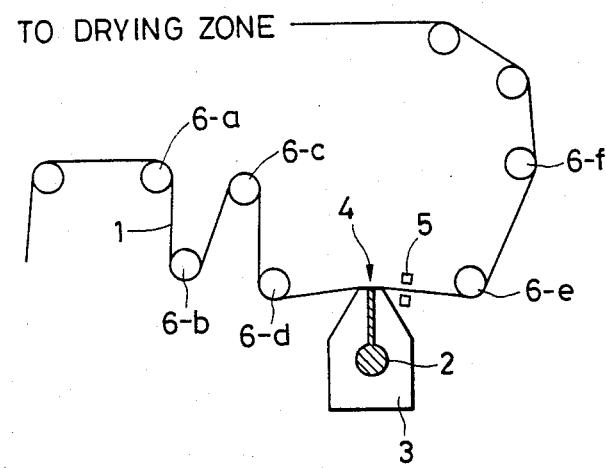
FIG. 1 is an explanatory diagram showing one example of a magnetic solution coating zone in a coating apparatus to which a coating method of this invention is applied.

FIG. 1 is an explanatory diagram showing one example of a coating zone employed in a coating method according to the invention. As shown in FIG. 1, a web 1 is supplied from a supply roll (not shown) to a coating head zone, where it is coated with a coating solution 2 by means of a coating head 3. The web 1 is then conveyed to a drying zone. The coating solution 2 is supplied into the coating head by a quantitative pump (not shown), thus forming a solution pool between the end of the coating head and the web 1 to coat the web 1 with the coating solution.

In the coating method of the invention, in order to uniformly coat with the coating solution a web which has been subjected to greater tension on one side with respect to a longitudinally extending center line, as was described before, immediately after the coating is formed on the web, the thickness of the coating is measured with a thickness measuring instrument to detect the variation in thickness of the coating, and at least one roll before and/or after the coating head is so tilted as to cancel out the variation.

The amount of inclination per roll with a roll bearing span of 750 mm is 0.5 to 20 mm, preferably 0.5 to 15 mm. The amount of inclination should be selected in the above-described range according to the thickness of the base and the degree of one-sided stretch of the web.

Figure 2:
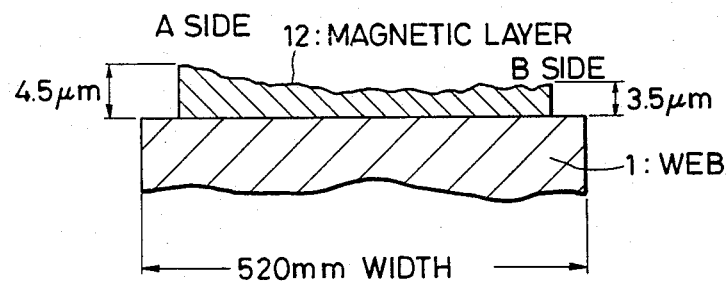
FIG. 2 is an enlarged sectional view showing one example of the variation in thickness of a film formed on a web.

FIG. 2 is an enlarged sectional view showing how a film 12 formed on the web 1 with a magnetic solution is not uniform in thickness in the widthwise direction. In the coating method of the invention, the thickness of such film is detected with a thickness measuring instrument 5. According to the thickness thus detected, at least one of rolls 6-a through 6-f in the coating zone is tilted in a direction perpendicular to the surface of the web. For instance, in the case of the roll 6-d or 6-e, its one end is moved vertically in FIG. 1, and in the case of the roll 6-c or 6-f, its one end is moved horizontally in the drawing. The rolls 6-a to 6-f can be titled by attaching the bearings of their respective ends to a movable support. In the case where the variation in thickness as shown in FIG. 2 is detected, at least one roll is tilted in a direction perpendicular to the surface of the web so that the variation is eliminated, i.e., the film thickness becomes uniform. The roll tilting operation may be manually performed. However, it is preferable to provide a mechanism which automatically tilts the roll according to the value detected by the thickness measuring instrument.

In order to provide a full understanding of the invention, specific examples of the coating method according to the invention will be described.

SPECIFIC EXAMPLE 1

A magnetic solution having the composition described below was applied to a polyethylene terephthalate web 20 micrometers in thickness and 520 mm in width to form a film thereon in such a manner that the film had a thickness of 4 micrometers after drying.

| Magnetic Layer Coating Solution | |
|---|---|
| Co containing magnetic iron oxide (8 BET 35 m²/g) | 100 parts |
| Nitrocellulose | 10 parts |
| Polyurethane resin (Trade mark "Nipporan (phonetic) 2304") | 8 parts |
| Polyisocyanate | 8 parts |
| Cr₂O₃ | 2 parts |
| Carbonblack (average grain size 20 micrometers) | 2 parts |
| Stearic acid | 1 part |
| Butyl stearate | 1 part |
| Methylethylketon | 300 parts |
| Coating speed | 150 m/min |
| Coating width | 500 mm |
| Coating web tension | 10 kg/500 m width |

The above-described web was prepared as follows: A large web was longitudinally cut into eight (8) pieces, and of the eight pieces, one end piece was used as the web in Specific Example 1.

Figure 3:
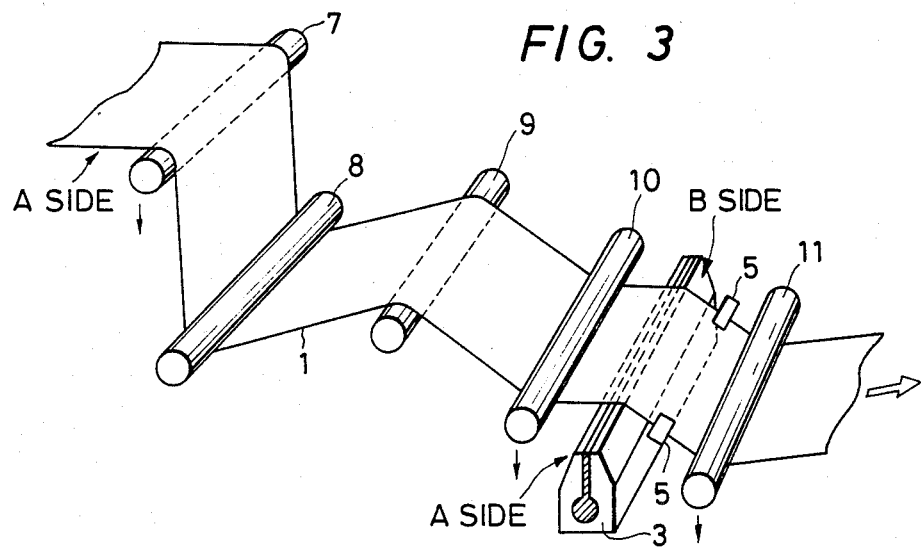
FIG. 3 is a perspective view showing one example of a coating head employed in the coating method of the invention.

FIG. 3 is a perspective view showing the coating head in more detail in the widthwise direction. According to the values detected by the thickness measuring instruments 5 in FIG. 3, only the roll 7 of rolls 7 through 11 was moved downwardly (in the direction of the arrow) 0.5 mm, 3 mm, 5 mm, 10 mm and 20 mm only on the A side of the web. The roll bearing span was 750 mm.

Figure 4:
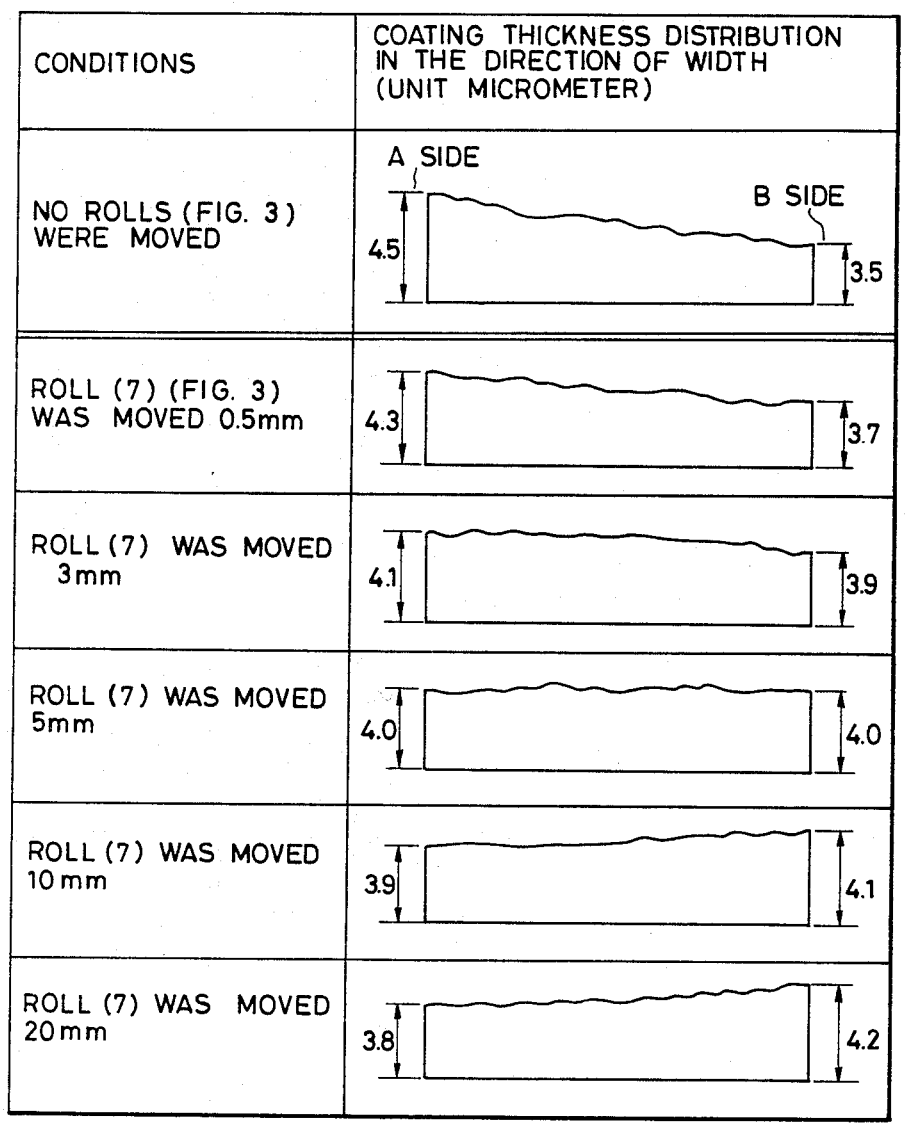
FIG. 4 shows a table indicating one example of a film thickness provided when no rolls are titled, and several examples of a film thickness provide when a roll is tilted according to the invention.

The coating thickness distribution was compared with that in the case where no rolls were moved (i.e., all the rolls and the coating head were kept parallel with one another). The results of comparison are as indicated in the table of FIG. 4.

As is apparent from the table, in the case where no rolls were moved, the coating thickness distribution in the widthwise direction indicates that the difference between the thickness at both sides was 1.0 micrometer. On the other hand, in the case where the roll was tilted 0.5 to 5 mm at one side, the difference between the thicknesses at both sides was reduced to 0.6 to 0.0 micrometer.

When the roll was tilted 10 to 20 mm at one side, the thickness at the A side was larger than that at the B side; however, the difference in thickness was still small, 0.2 to 0.4 micrometer. This means that the coating method of the invention is effective.

SPECIFIC EXAMPLE 2

The webs were used which were stretched only on one side and which were 7, 15, 38 and 75 micrometers in thickness. For each of the webs, the film thickness at the A side was compared with that at the B side in the case where the roll 7 in FIG. 3 was moved 5 mm downwardly (in the direction of the arrow) according to the data detected by the thickness measuring instruments 5. Similarly in the case where none of the rolls were moved the film thickness at the A side was compared with that at the B side.

The coating conditions, etc. were the same as those is specific Example 1 described above. The results of comparison are as indicated in the following Table 1:

TABLE 1

| | A side film thickness - B side film thickness (micrometers) | |
|---|---|---|
| Web thickness | None of rolls were moved. | Roll 7 was moved 5 mm |
| 7 | 0.8 | −0.1 |
| 15 | 0.9 | 0.1 or less |
| 38 | 1.1 | +0.1 |
| 75 | 1.2 | +0.2 |

It is apparent from Table 1 that, even if the base thickness is changed, the method of the invention is effective.

SPECIFIC EXAMPLE 3

In FIG. 3, the rolls 10 and 11 were alone tilted 5 mm downwardly (in the direction of the arrow) at the A side while the remaining rolls were not tilted. the coating conditions were the same as those in Specific Example 1, and the evaluation method was the same as that in Specific Example 2. The results of comparison are as indicated in the following Table 2:

TABLE 2

| | A side film thickness - B side film thickness (micrometer) |
|---|---|
| None of the rolls | 1.0 |

TABLE 2-continued

| | A side film thickness - B side film thickness (micrometer) |
|---|---|
| were moved. | |
| Roll 10 was moved 5 mm. | 0.1 or less |
| Roll 11 was moved 5 mm. | 0.1 or less |

As is apparent from Table 2, the same effect can be obtained by tilting the roll located immediately before or after the coating head.

SPECIFIC EXAMPLE 4

The roll 7 as tilted 2.5 mm downwardly and the roll 11 was also tilted 2.5 mm downwardly, while the remaining rolls were not tilted. The other conditions were the same as those in specific Example 1. The results are as indicated in the following Table 3:

TABLE 3

| | A side film thickness - B side film thickness (micrometer) |
|---|---|
| None of the rolls were moved. | 1.0 |
| Roll 7 and 11 were moved 2.5 mm. | 0.15 |

As is apparent from the specific examples described above, the tape product can be made uniform in thickness in its widthwise direction by tilting at least one roll in the coating zone.

Thus, the coating method of the invention is considerably effective in eliminating the difficulty that the resultant product is partially too large or too small in thickness.

The coating method of the invention can control the film thickness in the above-described manner and therefore can employ an on-line control system. For instance, the coating method may be so designed that, immediately after the coating operation or immediately before the winding operation, the film thickness distribution is detected with a wet film thickness measuring instrument such as an optical densitometer or by an iron component analysis with fluorescent rays, and in the coating zone the movement of at least one roll is controlled according to a difference to two detected thicknesses.

In the above-described Specific Examples 1 through 4, the roll was moved downwardly at the end where the film thickness was larger. However, it is also effective for uniformity of the film thickness to move the roll upwardly at the end where the film thickness was smaller.

If the roll is greatly tilted at one end, sometimes the web is displaced in the widthwise direction. This difficulty may be eliminated by providing a device for forcibly correcting the displacement of the web immediately before the coating station.

In the above-described concrete examples, the rolls 7, 10 and 11 were tilted vertically at one end; however, the same effect can be obtained by moving them horizontally as illustrated in FIG. 3.

In the coating method of the invention, in coating a running web with a magnetic solution by means of the extrusion type coater, according to the film thickness detected at least one roll in the coating zone is tilted in a direction perpendicular to the surface of the web so as to make the film thickness uniform. Therefore, a film can be formed uniform in thickness even on the web which has been stretched only in its one side. Thus, a magnetic recording medium high in quality can be manufactured according to the coating method of the invention.

What is claimed is:

1. An extrusion type coating method, comprising the steps of:
    running an elongated web over a plurality of rollers and adjacent to an extrusion coating head between said plurality of rollers;
    applying a coating solution through said coating head onto said web to form a film on said web;
    detecting a thickness of said film;
    tilting at least one of said rollers in a direction perpendicular to a major surface of said web adjacent said one roller in accordance with a variation of said detected thickness to reduce said variation.

2. A coating method as recited in claim 1, wherein said one roller is tiltable over a range of 0.5 to 20 mm per bearing span of said one roller of 750 mm.

3. A coating method as recited in claim 1, wherein said detecting step measures two thicknesses of said film at two transverse positions of said running web and wherein said tilting step is performed in accordance with a difference of said two thicknesses.

4. A coating method as recited in claim 3, wherein said detecting step measures said two thicknesses while said film is in a fluid state.

5. An extrusion type coating apparatus, comprising:
    a plurality of rollers for conveying a running web;
    an extrusion head intermediate said rollers and adjacent said running web for coating said web with a coating solution to form a film;
    means for detecting a thickness of said film;
    means for tilting at least one of said rollers in a direction perpendicular to a major surface of said web adjacent said one roller is response to a variation of said detected difference.

6. A coating apparatus as recited in claim 5, wherein said one roller is tiltable over a range of 0.5 to 20 mm per bearing span of said one roller of 750 mm.

7. A coating apparatus as recited in claim 5, wherein said detecting means measures two thicknesses of said film at two transverse positions of said running web and wherein said tilting means tilts said one roller in accordance with a difference of said two thicknesses.

8. A coating apparatus as recited in claim 7, wherein said detecting steps measures said two thicknesses of a fluid film.

* * * * *